Figure 1:
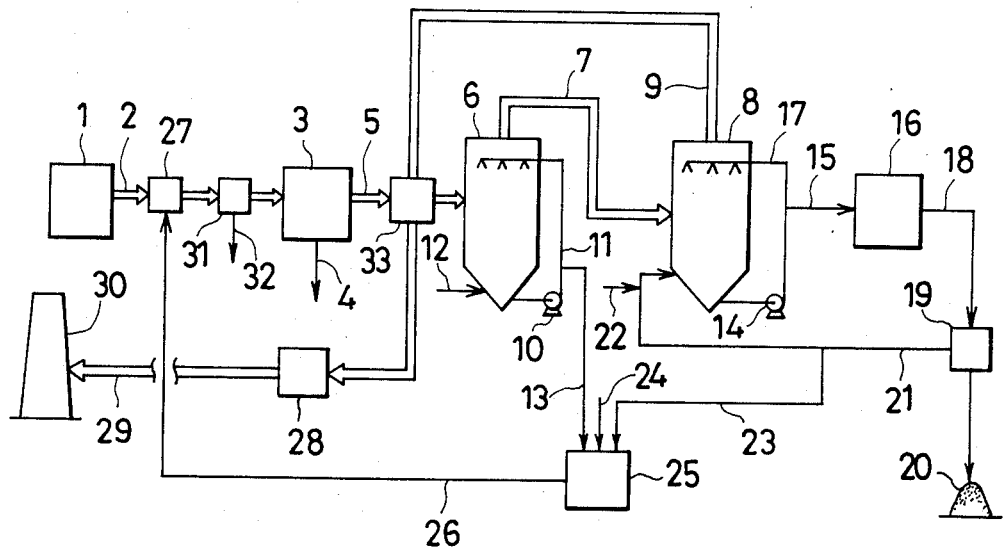

United States Patent [19]

Yoneda et al.

[11] Patent Number: 4,614,645

[45] Date of Patent: Sep. 30, 1986

[54] METHOD FOR TREATING EFFLUENT IN EXHAUST GAS TREATING APPARATUS

[75] Inventors: Kenichi Yoneda; Masato Miyake; Kenzo Muramatsu, all of Tokyo; Atsushi Tatani, Hiroshima, all of Japan

[73] Assignee: Mitsubishi Jukogyo Kabushiki Kaisha, Tokyo, Japan

[21] Appl. No.: 638,513

[22] Filed: Aug. 7, 1984

[30] Foreign Application Priority Data

Aug. 12, 1983 [JP] Japan ................................ 58-147857

[51] Int. Cl.$^4$ .................... C01B 7/00; C01B 17/00; B01D 19/00
[52] U.S. Cl. .................................. 423/240; 423/242; 55/71
[58] Field of Search ............ 423/240 R, 240 S, 242 R, 423/242 A, 244 R, 244 A; 55/71

[56] References Cited

U.S. PATENT DOCUMENTS

| 4,039,304 | 8/1977 | Bechtold et al. | 423/242 A |
| 4,297,332 | 10/1981 | Tatani et al. | 423/240 R |
| 4,317,806 | 3/1982 | Liesegang | 423/240 R |

Primary Examiner—Gregory A. Heller
Attorney, Agent, or Firm—Birch, Stewart, Kolasch & Birch

[57] ABSTRACT

A method for treating an effluent in an exhaust gas treating apparatus, which method comprises the steps of introducing the exhaust gas into a dry dust collector where a dust contained in the exhaust gas is removed; guiding the exhaust gas to a wet exhaust gas treating device where the exhaust gas is cleaned; and pouring the effluent discharged from the wet exhaust gas treating device into a stream above the dry dust collector where a dry solid matter is collected, characterized in that an amount of the effluent from the wet exhaust gas treating device is adjusted in accordance with a concentration of a halogen or a suspended material in the effluent from the wet exhaust gas treating device.

2 Claims, 2 Drawing Figures

METHOD FOR TREATING EFFLUENT IN EXHAUST GAS TREATING APPARATUS

The present invention relates to a method for reducing amount of an effluent and a sludge discharged from an apparatus for treating an exhasut gas including harmful components such as a sulfur oxide, halogen gas and dust.

From the viewpoint of the prevention of air pollution, as a method suitable for the apparatus for removing sulfur oxide, a wet lime-gypsum process is widely practically utilized to treat the exhaust gases from a heavy oil-fired boiler, a coal-fired boiler, a sintering plant, a metal refining plant and the like. Further, as a device for removing the dust in such an exhaust gas, a dry dust collector is often employed. Among various exhaust gases, the exhaust gas from the coal-fired boiler includes dust, halogen gas and NOx in addition to sulfur oxide. Therefore, the treatment of the exhaust gas from the coal-fired boiler requires the highest technique, and it is thus fair to say that the technique for treating such an exhaust gas from a coal-fired boiler can easily accomplish the treatment of other exhaust gases, in most cases.

Accordingly, in this specification, reference will be made to the treatment of the effluent from the exhaust gas treating device by which the exhaust gas from the coal-fired boiler is processed.

Figure 2:
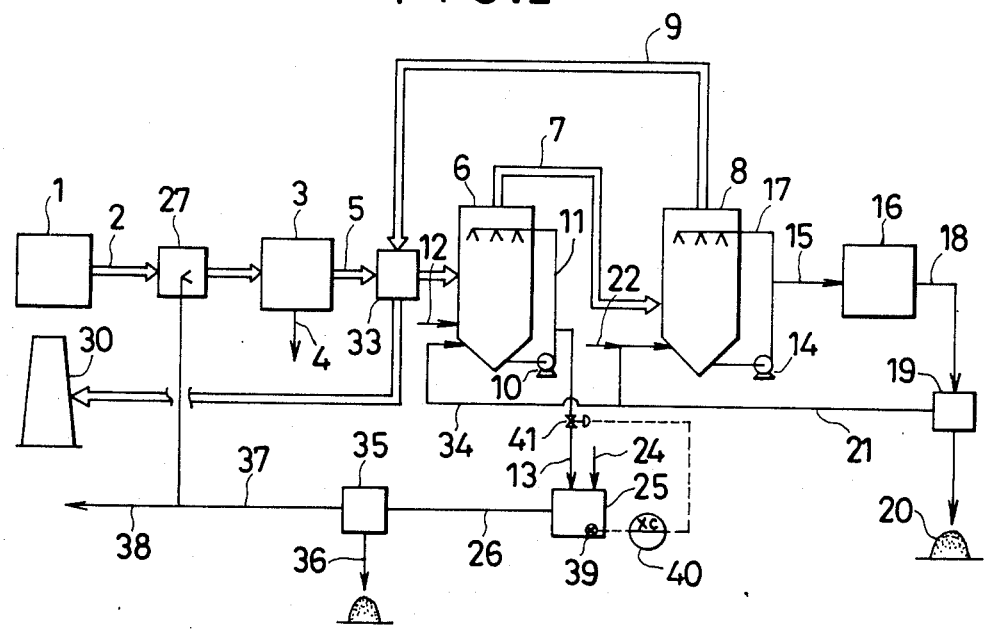

FIG. 1 of the accompanying drawings shows a flow sheet illustrating one embodiment for treating the effluent from a conventional device for treating the exhaust gas from a coal-fired boiler, and FIG. 2 shows a flow sheet illustrating an embodiment of the present invention.

In FIG. 1, an exhaust gas 2 discharged from a coal-fired boiler 1 is introduced into a dry dust collector 3, and most of a dust contained in the exhaust gas is then removed from its system in the form of a solid matter 4. Afterward, the exhaust gas 5 is guided to a gas-gas heater 33, where it is then heat exchanged with a cleaned exhaust gas 9 from an absorption tower 8, and is forwarded to a cooling tower 6, in which most of the dust and halogen compound in the exhaust gas are removed therefrom. After their removal, the exhaust gas is then introduced through an exhaust gas line 7 into the absorption tower 8 in which sulfurous acid gas ($SO_2$) is eliminated therefrom.

The cleaned exhaust gas 9 is sent from the absorption tower 8 to the gas-gas heater 33 where it is again heated. It is then introduced into a reheater 28 and is further heated therein and is finally discharged through a line 29 from a chimney 30 into the atmosphere.

In the cooling tower 6, a cleaning liquid is recycled through a recycling line 11 by a pump 10 and is sprayed into the exhaust gas, whereby the latter is cleaned, the dust and the halogen compound are collected, and humidifying as well as cooling of the exhaust gas is carried out. Moreover, for the purpose of compensating evaporated water, supplementary water 12 is fed to the cooling tower 6.

A cooling tower recycling solution including the dust and the halogen compound collected from the exhaust gas 5 is partially branched from the recycling line 11 and is sent to a neutralizing tank 25 through a line 13.

In the absorption tower 8, $SO_2$ contained in the exhaust gas is brought into contact with a slurry solution including limestone or slaked lime which is recycled through a recycling line 17 and which is sprayed in the tower 8, so that the $SO_2$ is converted into calcium sulfite.

The slurry solution including the produced calcium sulfite is recycled by a pump 14, and a part of the slurry solution is sent via a line 15 to an oxidizing tower 16, in which it is then converted into a gypsum slurry by virtue of air oxidation.

The gypsum slurry solution from the oxidizing tower 16 passes through a line 18 and reaches a solid-liquid separator 19, and in the latter, it is separated into a by-product gypsum 20 and a filtrate 21. Most of the filtrate 21 is mixed with limestone or slaked lime 22 and is then returned to the absorption tower 8.

On the other hand, a part of the filtrate 21 is carried to the neutralizing tank 25 through a line 23 in order to prevent soluble impurities from accumulating in the system. Into the neutralizing tank 25, limestone or slaked lime is introduced through a line 24, and in the tank 25, there are produced a gypsum and a hydroxide of a dissolved metal which is included in a part of the recycling liquid fed from the cooling tower 6 through a line 13 and in a part of the filtrate 21 delivered through the line 23.

The slurry solution including the above-mentioned hydroxide, gypsum and dust collected from the exhaust gas is all introduced from the neturalizing tank 25 through a line 26 into an evaporator 27 disposed above the dry dust collector 3. In the evaporator 27, the slurry solution which has come through the line 26 is sprayed through a two-fluid nozzle in order to be changed into tiny droplets. Then, these droplets are mixed with the exhaust gas in the evaporator 27 and are then evaporated. The solid matter in the droplets which has not been dried becomes a deposit, but it is removed as a deposit matter 32 by a deposit accumulation preventing device 31. The dried solid matter is collected and discharged as a solid matter 4 together with the dust in the exhaust gas 2 by means of the dry dust collector 3.

Such a conventional effluent treating method has the following drawbacks:

(1) Since the effluent from the absorption system is subjected to the neutralization treatment together with the effluent from the cooling tower, and these effluents are then sprayed into a stream above the dry dust collector, amounts of the sprayed effluents are greater than an amount of the effluent from the cooling tower. As a result, the temperature of the exhaust gas is lowered remarkably. Therefore, unless re-heating is carried out after a heat recovery by the gas-gas heater, the temperature of the exhaust gas will be low and white smoke will thus be generated, which fact will make impossible the direct discharge of the exhaust gas into the atmosphere through the chimney.

(2) When the total of the effluent from the absorption system and the effluent from the cooling tower is sprayed as the slurry solution through the two-fluid nozzle, the deposit will accumulate after the evaporation of the droplets. Thus, the deposit accumulation preventing device for preventing such an accumulation is essential.

(3) A great amount of supplementary water for the cooling tower is necessary.

(4) Corrosion (on the nozzle, the cooling tower, pipes and the like) due to the halogen and wear as well as clogging of the nozzle and the pipes due to the suspended material tend to occur.

In view of such circumstances, the inventors of the present application have intensively conducted research with the following aims:

(1) The temperature of the exhaust gas at the inlet of the chimney must to reach a predetermined level without requiring any member other than the gas-gas heater.

(2) Above the dry dust collector, the effluent which will be sprayed into the exhaust gas must be able to be evaporated and dried in a good efficiency.

(3) The effluent from the absorption system must be able to be used as supplementary water for the cooling tower.

(4) Dispensing with the deposit accumulation preventing device to the extent possible.

(5) Controlling the corrosion due to the halogen as well as the wear and tear and the clogging due to the suspended material.

As a result, it has been found that these objects can be accomplished by adjusting an amount of the effluent, which will be poured into a stream above the dry dust collector, in accordance with the concentration of the halogen or the suspended material present in the effluent from the wet exhaust gas treating device, and the present invention has now been established on the basis of this knowledge.

That is to say, the present invention is directed to a method for treating an effluent in an exhaust gas treating apparatus, which method comprises the steps of introducing the exhaust gas into a dry dust collector where a dust contained in the exhaust gas is removed, guiding the exhaust gas to a wet exhaust gas treating device where the exhaust gas is cleaned, and pouring the effluent discharged from the wet exhaust gas treating device into a stream above the dry dust collector where a dry solid matter is collected, characterized in that an amount of the effluent from the wet exhaust gas treating device is adjusted in accordance with a concentration of a halogen or a suspended matter in the effluent from the wet exhaust gas treating device.

The method of the present invention will be described in detail as follows:

In the method of the present invention, an amount of the effluent from the wet exhaust gas treating device is adjusted in compliance with the concentration of the halogen or the suspended material present in the effluent, and one example of such an effluent is the effluent from the cooling tower. If the effluent is drawn out from the cooling tower so that the concentration of the halogen or the suspended material present in the effluent, for example, the concentration of chlorine Cl may be within the range of 5,000 to 20,000 ppm, the concentration of fluorine F may be within the range of 1,000 to 5,000 ppm, or the concentration of the suspended material may be within the range of 1 to 5 wt %, the production of gypsum scale will be restrained by the action of the halogen compound or the dust contained in the recycling solution in the cooling tower, even when the effluent from the absorption system is introduced into the cooling tower. Therefore, any problem due to the gypsum scale will not occur, which fact permits employing the effluent from the absorption system as the supplementary water for the cooling tower. As a consequence, an amount of water which should be suppied from outside can be reduced.

When the effluent which has been drawn out from the cooling tower and which has been neutralized in the neutralizing tank is sprayed into the exhaust gas so that the concentration of the halogen or the suspended material contained in the effluent from the cooling tower, for example, the concentration of Cl may be within the range of 5,000 to 20,000 ppm, the concentration of F may be within the range of 1,000 to 5,000 ppm, or the concentration of the suspended material may be within the range of 1 to 5 wt %, spraying will be carried out in an amount of the effluent in proportion to a flow rate of the exhaust gas (the amount of the effluent will increase, as the flow rate of the exhaust gas will increase), with the result that the droplets will be evaporated and dried effectively. Accordingly, the amount of the deposit will be reduced, and the deposit accumulation preventing device can thus be omitted.

Since the amount of the effluent sprayed into the exaust gas increases or decreases in compliance with the flow rate of the exhaust gas as described above, a temperature drop of the exhaust gas resulting from the spray of the effluent will be constant. And since the effluent from the absorption system can be fed to the cooling tower as described above, the amount of the effluent sprayed into the exhaust gas can be reduced and the temperature drop resulting from the spray of the effluent will also be small. Therefore, the temperature of the gas to be discharged through the chimney into the atmosphere can be maintained at a constant level only by the heat recovery with the aid of the gas-gas heater, and no reheater is thus required. Since the concentration of Cl or F is maintained at a constant level, no corrosion will occur and the concentration of the suspended material is maintained at a constant level, therefore neither the wear nor the clogging of the nozzle and the pipes will occur.

An embodiment of the present invention will be described in detail with reference to FIG. 2 as follows:

In FIG. 2 attached hereto, reference numerals 1 to 22, 24 to 27 and 30 are all the same as in FIG. 1. As seen in FIG. 2, a sludge separator 35, a sludge 36, lines 37 and 38 are additionally disposed between the neutralizing tank 25 and the evaporator 27. Further, between the absorption tower 8 and the chimney 30, the line 9 is only arranged, and members corresponding to the reheater 28 and the line 29 shown in FIG. 1 are nowhere present in FIG. 2. Furthermore, between the evaporator 27 and the dry dust collector 3 in FIG. 2, there is no deposit accumulation preventing device 31. In the embodiment shown in FIG. 1, the gypsum slurry solution is separated into the by-product gypsum 20 and the filtrate 21, and the latter is sent to the absorption tower 8 and the neutralizing tower 25 through the line 23, but in the embodiment shown in FIG. 2, the filtrate 21 is not introduced into the neutralizing tower 25.

In FIG. 2, the exhaust gas 2 from the coal-fired boiler 1 is introduced into the dry dust collector 3 in which the dust contained in the exhaust gas is changed into the solid material 4, and this solid material is then discharged from the system. Afterward, the exhaust gas 5 in which most of the dust has been removed is introduced into a gas-gas heater 33, is then heat exchanged with the cleaned exhaust gas 9 from the absorption tower, is guided to the cooling tower 6 in which most of the dust and the halogen compound are removed, and is further introduced through the line 7 into the absorption tower 8 in which $SO_2$ is eliminated. The cleaned exhaust gas 9 is returned from the absorption tower 8 to the gas-gas heater 33 and is heated there again, and it is then discharged into the atmosphere through the chimney 30. In the cooling tower 6, the cleaning liquid fed through the recycling line 11 by means of the pump 10 is sprayed into the exhaust gas 5, whereby the exhaust gas 5 is cleaned, the dust and the halogen compound are collected, and humidifying and cooling of the exhaust gas are carried out. For compensation of evaporated water, supplementary water 12 and the filtrate (the effluent from the absorption system) in which the gypsum slurry has been separated out by a solid-liquid separating technique are fed to the cooling tower through a line 34. Further, the cooling tower recycling liquid in which the dust and the halogen compound collected from the exhaust gas 5 are included is partially branched from the recycling line 11 and is then delivered to the neutralizing tank 25 through the line 13.

In the absorption tower 8, the compound $SO_2$ included in the exhaust gas is brought into contact with and is absorbed by the slurry solution containing limestone or slaked lime which is recycled through the recycling line 17 and which is sprayed in the absorption tower, so that the $SO_2$ is converted into calcium sulfite. The slurry solution including the thus produced calcium sulfite is recycled by the pump 14, and a part of the slurry solution is sent via the line 15 to the oxidizing tower 16 in which it is changed into a gypsum slurry by air oxidation.

The gypsum slurry solution from the oxidizing tower 16 is carried through a line 18 to the solid-liquid separator 19 in which it is separated into the by-product gypsum 20 and the filtrate 21. Most of the filtrate 21 is mixed with limestone or slaked lime and is returned to the absorption tower 8. On the other hand, a part of the filtrate 21 is fed to the cooling tower 6 through the line 34 for the purpose of preventing the accumulation of soluble impurities.

The concentration of Cl can be detected by means of a concentration detector 39 to generate a signal, which is then exchanged into an external signal by an adjusting meter 40. A flow rate of the solution extracted from the cooling tower is then adjusted by an adjusting valve 41 on the basis of this external signal so that the concentration of Cl present in the slurry in the neutralizing tank 25 may be 10,000 ppm, and a part of the cooling tower recycling solution is sent to the neutralizing tank 25 through the line 13. Further, limestone or slaked lime is fed through a line 24 to the neutralizing tank 25 in which a hydroxide of a dissolved metal in the recycling solution from the cooling tower and a gypsum are produced.

The slurry including the hydroxide, the gypsum and the dust collected from the exhaust gas is fed to the sludge separator 35 through a line 26. In the sludge separator 35, the slurry is separated into a sludge 36 and a filtrate 37. The latter is all fed to the evaporator 27 disposed at a stream above the dry dust collector 3. Moreover, a part of the filtrate 37 is occasionally discharged from the system through the line 38.

In the evaporator 27, the filtrate forwarded through the line 37 is jetted through a two-fluid nozzle in order to be changed into tiny droplets, which are then mixed with the exhaust gas 2 and are evaporated to produce a solid. The latter is collected together with the dust in the exhaust gas 2 in the downstream dry dust collector 3 and is discharged as a solid matter 4. A part of the recycling solution in the cooling tower 6 is fed to the neutralizing tank 25 so that the concentration of Cl contained in the slurry in the neutralizing tank 25 may be 10,000 ppm. However, it may be fed to the neutralizing tank 25 so that the concentration of F in the slurry or the suspended material may be at a constant level.

According to the present invention which has been described above in detail, the following functional effects can be obtained:

(1) By adjusting the amount of the solution sprayed into the exhaust gas, the temperature drop of the exhaust gas can be controlled. Therefore, the temperature of the gas at the inlet of the chimney can be maintained at a predetermined temperature only by the heat recovery with the aid of the gas-gas heater, and thus a reheater is not required.

(2) The effluent from the absorption system can be used as the supplementary water for the cooling tower, therefore the amount of the supplementary water to be fed from outside can be reduced.

(3) The droplets are evaporated effectively, therefore the amount of the formed deposit is decreased. As a result, no deposit accumulation preventing device is required.

(4) By uniformizing the concentration of the halogen, the corrosion can be inhibited.

(5) By uniformizing the concentration of the suspended material, wear and tear and clogging of the nozzle and the pipes can be prevented.

In the following, a comparative example and an example of the present invention will be described:

COMPARATIVE EXAMPLE

For confirmation of a conventional manner, a pilot plant shown in FIG. 1 was employed by which 4,000 $Nm^3/h$ of an effluent from a coal-fired boiler could be treated. Properties of an exhaust gas 2 are set forth in Table 1 below:

TABLE 1

| Properties of the exhaust gas from the pilot plant | |
|---|---|
| Amount of the gas to be treated | 4,000 to 2,000 $Nm^3/h$ |
| Concentration of $SO_2$ | 1,200 ppm |
| Concentration of HCl | 30 ppm |
| Concentration of HF | 7 ppm |
| Concentration of the dust | 300 $mg/Nm^3$ |
| $H_2O$ in the exhaust gas | 7.8% |
| Temperature of the gas | 150° C. |

A cleaning solution 11 was continuously fed from the cooling tower 6 to the neutralizing tank 25 through the line 13 at a rate of 20 l/h. Properties of the cleaning solution at this time are set forth in Table 2 below:

TABLE 2

| Properties of the cleaning solution from the cooling tower | |
|---|---|
| pH | 0.5 to 2.0 |
| Concentration of dissolved $Cl^-$ | 8,000 to 4,000 ppm |
| Concentration of dissolved $F^-$ | 900 to 400 ppm |
| Concentration of a suspended matter | 2.0 to 0.5 wt % |
| Concentration of dissolved $Al^{3+}$ | 900 to 400 ppm |
| Concentration of dissolved $Ca^{2+}$ | 600 to 200 ppm |
| Concentration of dissolved $Mg^{2+}$ | 300 to 100 ppm |

The filtrate 21 in which the gypsum had been separated out was partially fed to the neutralizing tank 25 through the line 23 at a rate of 12 l/h.

Properties of the filtrate at this time are set forth in Table 3 below:

TABLE 3

| Properties of the filtrate in which the gypsum was separated out | |
|---|---|
| pH | 4.5 |

TABLE 3-continued

| Properties of the filtrate in which the gypsum was separated out | |
|---|---|
| Concentration of the suspended matter | 0.5 wt % |
| Concentration of dissolved $Cl^-$ | 600 to 300 ppm |
| Concentration of dissolved $Mg^{2+}$ | 1,200 ppm |
| Concentration of dissolved $SO_4^{2-}$ | 5,760 ppm |
| Concentration of dissolved $Ca^{2+}$ | 720 ppm |

To the neutralizing tank 25, a powder 24 of $Ca(OH)_2$ was added, while in the tank 25, the cleaning solution 13 from the cooling tower 6 was mixed with the filtrate 23 in which the gypsum had been separated out, in order to adjust a pH of the resulting neutralized slurry to 7 to 12 an average of which was 11. An average feeding rate of the $Ca(OH)_2$ powder was 600 g/h. The neutralized slurry was sent out from the neutralizing tank 25 through the line 26 and was then sprayed into the exhaust gas 2 in the evaporator 27, while air was blown thereinto at a rate of about 8 $Nm^3/h$ through a two-fluid nozzle utilizing air therein which was disposed in a circular duct having an inner diameter of 350 mm nearly at the central position thereof. The exhaust gas 2 was an unsaturated gas having a temperature of 150° C. and a moisture content of 7.8 vol %. The neutralized slurry 26 which was sprayed thereinto at a rate of 32 l/h was evaporated, and the exhaust gas had a temperature of 135° to 120° C. and a moisture content of 8.8 to 9.8 vol %.

This exhaust gas was introduced into a dry dust collector 3 and was then forwarded to the gas-gas heater. Gas temperatures at some positions in this case were as follows:

It was 90° to 80° C. at an outlet of the gas-gas heater, it was 50° to 48° C. at an outlet of the cooling tower, it was 50° to 48° C. at an outlet of the absorption tower, and it was 90° to 83° C. (a temperature of the gas guided from the absorption tower to the gas-gas heater) at an outlet of the gas-gas heater. Supplementary water was fed to the cooling tower at a rate of 188 l/h on the average. Further, a deposit was discharged from the deposit accumulation preventing device at a rate of 4 kg/h on the average. The gas heated up to 95° C. by the gas-gas heater was discharged therefrom into the atmosphere.

EXAMPLE

A pilot plant shown in FIG. 2 was employed by which 4,000 $Nm^3/h$ of an effluent from a coal-fired boiler could be treated. Properties of the exhaust gas 2 are as set forth in Table 1 above. The effluent from the absorption system was fed to the cooling tower through a line 34 at a rate of 12 l/h. Composition of the effluent was as set forth in Table 3 above. The cleaning liquid in the cooling tower 6 was continuously fed to the neutralizing tank 25 through the line 13 so that a concentration of Cl contained in the slurry in the neutralizing tank 25 may be 10,000 ppm. An average flow rate of the cleaning liquid was 20 l/h. Properties of the cleaning liquid at this time are set forth in Table 4 below:

TABLE 4

| Properties of the cleaning liquid in the cooling tower | |
|---|---|
| pH | 0.5 |
| Concentration of dissolved $Cl^-$ | 10,000 ppm |
| Concentration of dissolved $F^-$ | 1,100 ppm |
| Concentration of a suspended material | 5 wt % |
| Concentration of dissolved $Al^{3+}$ | 980 ppm |
| Concentration of dissolved $Ca^{2+}$ | 600 ppm |
| Concentration of dissolved $Mg^{2+}$ | 580 ppm |

To the neutralizing tank 25, a $Ca(OH)_2$ powder 24 was added over stirring so as to adjust a pH of the resulting neutralizing slurry to 8.0. An average feeding rate of the $Ca(OH)_2$ powder was 480 g/h. The neutralized slurry in the neutralizing tank 25 was fed through the line 26 to the sludge separator 35, in which the sludge 36 was separated at a rate of 2.6 kg/h. The total amount of the separated filtrate 37 was fed to the evaporator 27 at a rate of 18 l/h and was sprayed thereinto. The exhaust gas was an unsaturated gas having a temperature of 150° C. and a moisture content of 7.8 vol %, and the exhaust gas which had been sprayed with the filtrate at the rate of 18 l/h had a temperature of 143° C. and a moisture content of 8.3 vol %.

This exhaust gas was then introduced, via the dry dust collector 3, into the gas-gas heater 33. In this case, gas temperatures at some positions were as follows: It was 90° C. at an outlet of the gas-gas heater, it was 50° C. at an outlet of the cooling tower, it was 50° C. at an outlet of the absorption tower, and it was 95° C. (a temperature of the gas guided from the absorption tower to the gas-gas heater) at an outlet of the gas-gas heater. Supplementary water was fed to the cooling tower at a rate of 176 l/h on the average. No deposit was put on the evaporator. The gas which had gone out of the gas-gas heater was discharged into the atmosphere through the chimney without reheating.

What is claimed is:

1. A method for treating and reducing amounts of an effluent produced in an exhaust of stack gas from a coal-fire boiler, which method comprises the steps of:
    (a) introducing an exhaust gas, having harmful components of at least one of sulfur oxide, a halogen gas, and suspended dust material therein, into a dry dust collector where said dust contained in said exhaust gas is removed, said halogen gas being either fluorine or chlorine;
    (b) conveying said exhaust gas from said dry dust collector to a wet exhaust gas treating device where said exhaust gas is cleaned;
    (c) pouring said effluent produced in said wet exhaust gas treating device into a stream above said dry dust collector;
    (d) adjusting an amount of said effluent from said wet exhaust gas treating device by an adjusting meter in accordance with a determined concentration of said halogen gas, or said suspended dust material in said effluent from said wet exhaust gas treating device, said adjustment being made such that a concentration of chlorine reaches a range of 5,000 to 20,000 ppm, a concentration of fluorine reaches a range of 1,000 to 5,000 ppm and a concentration of suspended dust material becomes 1 to 5 wt %; and
    (e) neutralizing said waste solution to pH of 8.0.

2. The method of claim 1 wherein said neutralizing step is achieved with slaked lime or lime.

* * * * *